United States Patent [19]

Trejo et al.

[11] Patent Number: 5,580,069
[45] Date of Patent: Dec. 3, 1996

[54] RUNNER TO BICYCLE CONNECTING DEVICE

[76] Inventors: Luis Trejo, 713 Roosevelt Ave.;
Edward J. Vargas, 808 E. Viewcrest Dr., both of Montebello, Calif. 90640

[21] Appl. No.: 491,297

[22] Filed: Jun. 12, 1995

[51] Int. Cl.⁶ .................................................. B62D 51/04
[52] U.S. Cl. ........................................ 280/1.5; 280/304.5
[58] Field of Search .................................. 280/1.5, 288.4, 280/290, 293, 304.5

[56] References Cited

U.S. PATENT DOCUMENTS

| | | | |
|---|---|---|---|
| 3,926,448 | 12/1975 | Reichard | 280/1.5 |
| 5,106,108 | 4/1992 | Howell | 280/1.5 |
| 5,215,355 | 6/1993 | Klumpjan | 280/1.5 X |
| 5,375,861 | 12/1994 | Gifford | 280/1.5 X |
| 5,385,355 | 1/1995 | Hoffman | 280/1.5 |

FOREIGN PATENT DOCUMENTS

86/00054  1/1986  WIPO ....................................... 280/1.5

*Primary Examiner*—Kevin Hurley

[57] ABSTRACT

A shaped tubular member connects a runner to a riderless bicycle. The runner attaches the tubular member to the bicycle and then attaches the waist belt clasp to the tubular member. With no hands on the bicycle, the runner accelerates forward and the riderless bicycle follows at the same speed. The tubular member is allowed to move up and down with the stride of the runner. The tubular member is of breakdown construction for ease in transportation as the runner continues the exercise on the bicycle.

3 Claims, 2 Drawing Sheets

5,580,069

RUNNER TO BICYCLE CONNECTING DEVICE

BACKGROUND OF THE INVENTION

1. Field of the Invention

The present invention relates to bicycles, and more specifically to a device that connects a runner to a bicycle. The device is used during physical exercise by alternating between running and bicycling. The device allows a run, with hands free, alongside a riderless bicycle in forward motion.

2. Prior Art

While running, runners have been known to hold the top of a bicycle handlebar stem with one hand and the other hand in unison with the runner's body motion. Trying to hold the bicycle straight and steady with one hand, the runner has difficulty gaining true form of stride and rhythm of breath. As a consequence the runner does not achieve top performance.

Devices are known which connect two bicycles in parallel, with one bicycle riderless such as the "Twin Bicycle Connecting Frame" of Staler U.S. Pat. No. 3,516,686 and the "Attachment Apparatus for Side-By-Side Bicycles" of Thiessen U.S. Pat. No. 4,288,089.

No device is known, however, for connecting, in a safe manner, a runner and a riderless bicycle in parallel while both in forward motion.

SUMMARY OF THE INVENTION

The principal object of our invention is to provide a device for use by runner who needs to accomplish a physical exercise by alternating between running and bicycling in an effective and safe manner during a runner's long distance track.

It also is an object of the present invention to provide such a device which is of simple and inexpensive construction.

Another object is to provide such a device in light-weight form that can be disassembled quickly and placed in a backpack or bicycle saddle bag for ease of transport.

Another object is to provide such a device that can be used on either the left side or right side of bicycle.

A further object is to provide such a device which, in use, will allow the runner to keep his hands off the bicycle and freedom body motion during the exercise.

The forgoing objects can be accomplished by providing a connecting device located between the runner and the bicycle. One portion of the device is a U-shaped tubular section attached to a standard belt worn around the runner's waistline. The other portion of the device is an L-shaped tubular section with its free end allowed to swivel insider a coupling that is attached to the bicycle saddle support. The device allows for independent vertical movement of the bicycle and runner while forward motion of the runner and bicycle remain in unison. The bicycle's front steering assembly is held steady and in line with the bicycle frame by use of an elastic cord in tension. One end of the elastic is anchored to a metal bracket at the bicycle saddle support and the other end of the elastic cord is anchored to a metal bracket at the handlebar stem. The device can be used by a runner on the right side or left side of the bicycle with minimal adjustments to the device.

DETAILED DESCRIPTION

Figure 1:
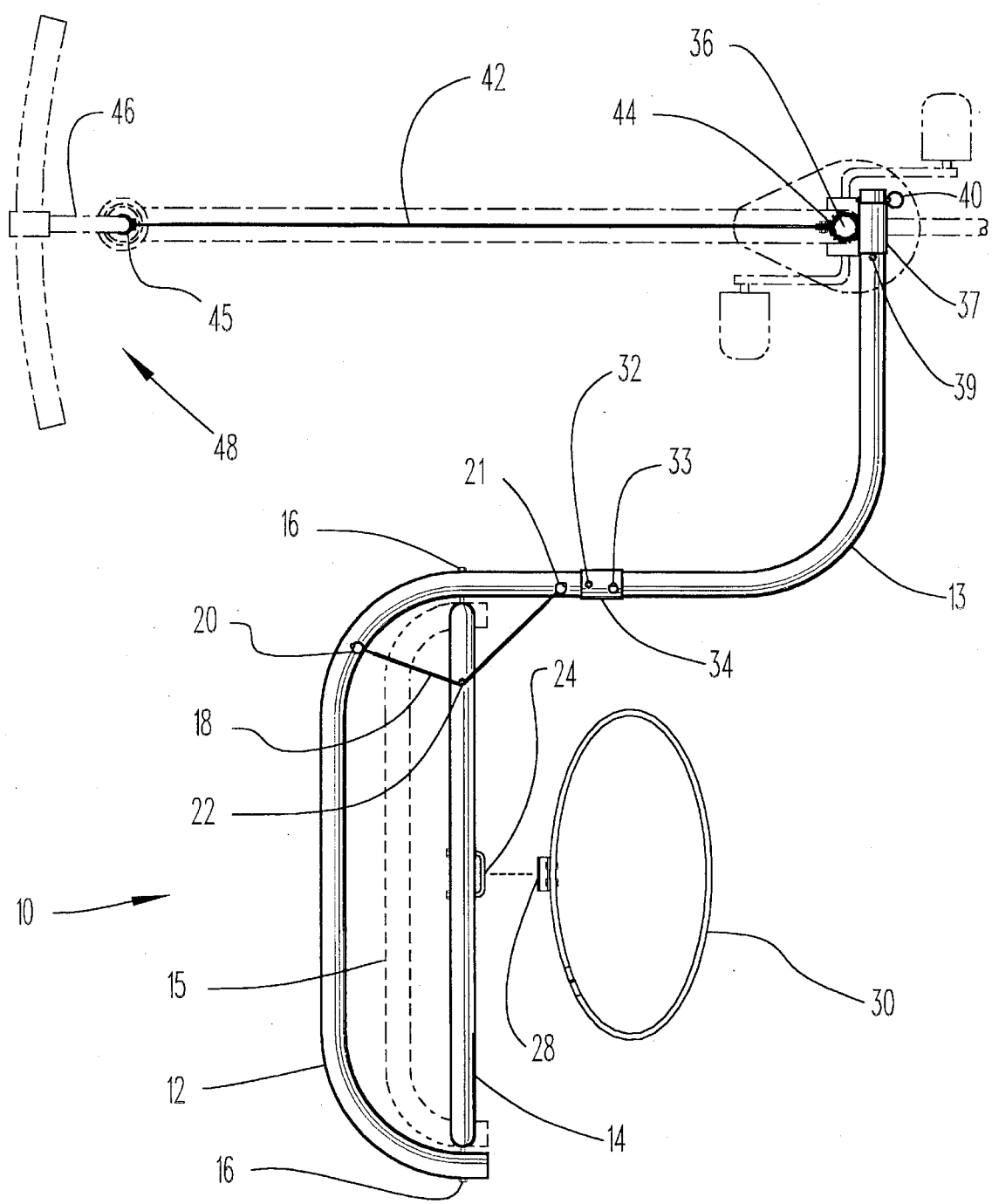
FIG. 1 is a top view of the runner to bicycle connecting device in accordance with the present invention.

As shown in FIG. 1, the preferred runner to bicycle connecting device in accordance with the present invention has been denoted generally by the reference numeral 10.

Describing the runner to bicycle connecting device 10 in sufficient detail to permit an understanding and appreciation of our invention, it will be pointed out that the device 10 comprises an outer U-shaped tubular standard section 12 that has a width and depth of shape to accommodate the waist line of an average runner, an inner U-shaped tubular standard member 14 that fits loosely within the U-shape of the outer U-shaped standard section 12, an L-shaped tubular standard section 13 that is joined with the end portion of the outer U-shaped standard section 12 at a standard tube coupling 34, a standard tube coupling 37 that receives an end portion of the L-shaped standard section 13, a standard waist belt 50 which receives and holds the inner U-shaped standard member 14, and an elastic tension member 42 for steadying the bicycle steering assembly 48.

Preferably, all of the standard tubular sections are lightweight metal tubing such as aluminum alloy.

At this time attention is directed to the inner U-shaped standard member 14. Each leg of the inner U-shaped standard member 14 is joined with each leg of the outer U-shaped standard section 12 with a bolt 16 that extends through each leg. A hinge is created at bolt 16 where inner U-shaped standard member 14 is allowed to rotate relative to the horizontal position of outer U-shaped standard section 12.

Figure 2:
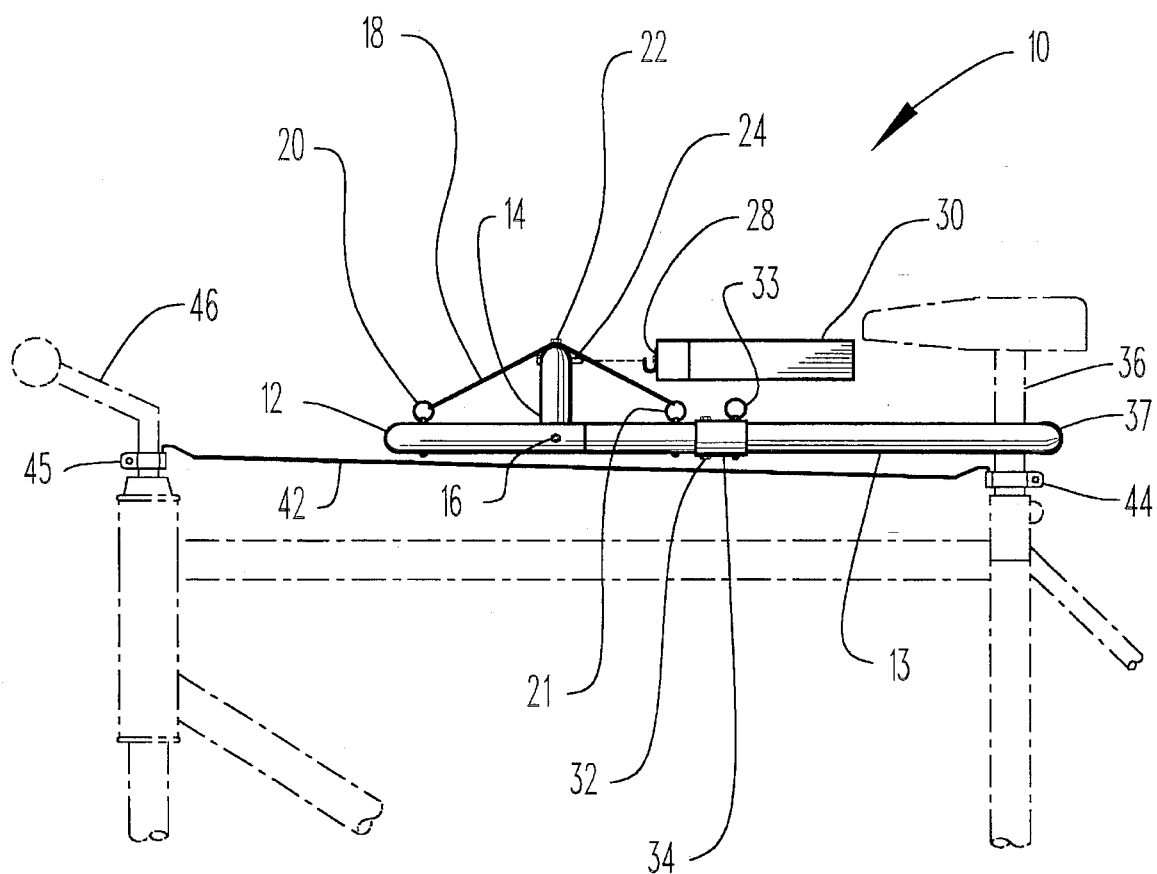
FIG. 2 is a side view of the device of FIG. 1.

As best seen in FIG. 2, the initial position of inner U-shaped standard member 14 is upright relative to the horizontal position of outer U-shaped standard section 12. The inner U-shaped standard member 14 is steadied upright with an elastic tension member 18 acting as a guy wire. The one piece elastic tension member 18 is anchored at one end to the cotterless pin with keyring 20 and anchored at the other end to the cotterless pin with keyring 21. The elastic tension member 18 is stretched over the inner U-shaped standard member 14 and clamped under the bolt head 22. The short length of elastic tension member 18 limits the rotation of the inner U-shaped standard member 14 to one quarter circle rotation forward and one quarter circle rotation backward relative to the horizontal position of the outer U-shaped standard section 12. As illustrated in FIG. 1, the inner U-shaped standard member 15 is shown at its most forward position relative to its initial upright position 14. Upon release of the runner's pressure on inner U-shaped standard member 14, the final position of inner U-shaped standard member 14 is upright relative to the horizontal position outer U-shaped standard section 12. It is intended that the inner U-shaped standard member 14 with its attachment to the elastic tension member 18 perform as a deeper. The inner U-shaped standard member 18 dampens the runner's body forces on the connecting device 10. These forces are created by various body motions as the runner strides forward.

Attention is called this time to standard waist belt 30 worn by the runner. A bent U-shaped plate 28 is fastened to the standard waist belt 30 with two metal rivets. The U-shaped bracket 24 is bolted to the inner U-shaped standard member 14. The runner connects to the runner to bicycle connecting device 10 by attachment of the U-shaped plate 28 up into the U-shaped bracket 24.

A standard tube coupling 34 joins the outer U-shaped standard section 12 to the L-shaped standard section 13. The standard tubular sections 12 and 13 are held aligned and in non-rotative relationship by bolt 32 near one end of the standard tube coupling 34 and a cotterless pin with keyring 33 near the other end of the standard tube coupling 34.

As seen in FIG. 1, at the bicycle saddle support 6 is located a standard tube coupling with clamp 37 for receiving an end portion of L-shaped standard section 13. The standard tube coupling with clamp 37 is positioned horizontally and clamped to saddle support 36. Standard tube coupling 37 is sized as to allow relative rotation of L-shaped standard section 13. Near the end portion of L-shaped standard section 13 is located a cotterless pin with keyring 40 which prevents pullout from standard tube coupling 37. Bolt 39, through the L-shaped standard section 13, limits the extent of end portion L-shaped standard section 13 into standard tube coupling 37. Either end of standard tube coupling 37 can receive the end portion of L-shaped standard section 13.

As best seen in FIG. 2, a standard clamp bracket 44 is clamped to saddle support 36 and a standard clamp bracket 45 is clamped to bicycle handlebar stem 46. Elastic tension member 42 is temporarily anchored to clamp bracket 44 then stretched and temporarily anchored to clamp bracket 45. It is intended that the elastic tension member 42 provide a tension force that will steady the bicycle steering assembly 48.

Preferably the elastic tension members 18 and 42 be made of a rubber material or coiled metal spring.

The use of connecting device 10 on either the right side or the left side of the bicycle requires that inner U-shaped standard member 15 always be in the upright position relative to the horizontal position of outer U-shaped standard section 12. The foregoing can be accomplished by removing cotterless pin 20 and 21 and relocating cotterless pin 20 and 21 and elastic tension member 18 on the opposite side of the outer U-shaped standard section 12.

It is intended that the runner to bicycle connecting device 10 be portable. To breakdown the connection device 10, cotterless pin 40 and cotterless pin 33 are removed. The breakdown construction of the connecting device 10 allows it to be assembled and disassembled quickly and also allows it to be transported easily such as in a backpack or bicycle saddlebag.

Prior to mounting the bicycle, elastic tension chord 42 is disengaged at standard clamp 44 and standard clamp 45.

Preferably the width of outer U-shaped tubular standard section 12 is at least about 17.5 inches (44.45 cm), the length of the short leg is at least about 4.75 inches (12.06 cm), and the length of the long leg is at least about 8.25 inches (20.95 cm). The width of inner U-shaped tubular standard member 14 is at least about 15.75 inches (40.00 cm) and the length of each leg is at least about 2.75 inches (6.98 cm). The L-shaped tubular standard section 13 has a short leg length of at least about 8.25 inches (20.95 cm) and a long leg length of at least about 12 inches (30.48 cm). Measurements are taken from center line to center line of the tubular sections.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by the detailed description, but rather by the claims appended hereto.

We claim:

1. A runner to bicycle connecting device for use during physical exercise by alternating between running and bicycling comprising: an outer U-shaped section and an L-shaped section connected end-to-end in an aligned, non-rotative relationship, an inner U-shaped member, said inner U-shaped member located within the U-shape of said outer U-shaped section, said inner U-shaped member being pivotally connected to said outer U-shaped section, in use, said inner U-shaped member being in an upright position relative to the horizontal position of said outer U-shaped section, means for allowing limited rotation of said inner U-shaped member relative to the horizontal position of said outer U-shaped section, a waist belt, said waist belt being adapted to removably connect to said inner U-shaped member, a tube coupling adapted to connect to a bicycle seat tube, said tube coupling connected to an end portion of said L-shaped section, and means for steadying a bicycle steering assembly.

2. A runner to bicycle connecting device comprising an outer U-shaped tubular section and an L-shaped tubular section connected end-to-end in an aligned, non-rotative relationship, an inner, U-shaped tubular member, said inner U-shaped member generally located within the U-shape of said outer U-shaped section, connection means for pivotally attaching the free ends of said inner U-shaped member to the free ends of said outer U-shaped section, in use, said inner U-shaped member being in a substantially upright position relative to a horizontal position of said outer U-shaped section, means for limiting rotation of said inner U-shaped member to a one quarter circle rotation forward and one quarter circle rotation backward relative to the horizontal position of said outer U-shaped section, a waist belt, said waist belt to receive said inner U-shaped member, means for removably attaching said waist belt to said inner U-shaped member, a tube coupling receiving an end portion of said L-shaped section, said tube coupling allowing rotation of said L-shaped member relative to said tube coupling, said tube coupling including means for attaching said tube coupling to a bicycle saddle support, a tension member for steadying a bicycle steering assembly, and said tension member adapted to apply a tension force to, and spanning between, a bicycle saddled support and a bicycle handlebar stem.

3. A runner to bicycle connecting device comprising an outer U-shaped tubular section, an L-shaped tubular section, connection means for joining said sections generally end-to-end in an aligned and non-rotative relationship, said outer U-shaped section and said L-shaped section substantially lying in a common plane, an inner U-shaped tubular member, said inner U-shaped member generally located within the U-shape of said outer U-shaped section, means for pivotally attaching the free ends of said inner U-shaped member to the free ends of said outer U-shaped section, in use, said inner U-shaped member being in a substantially upright position relative to a horizontal position of said outer U-shaped section, means for limiting rotation of said inner U-shaped member to a one quarter circle rotation forward and generally one quarter circle rotation backward relative to the general horizontal position of said outer U-shaped section, a waist belt, means for removably attaching said waist belt to said adapted to receive an end portion of said L-shaped section, said tube coupling allowing relative rotation of said L-shaped section, means for preventing removal of the end portion of said L-shaped section from said tube coupling, said tube coupling including means for attaching said tube coupling to a bicycle saddle support, a tension member for steadying a bicycle steering assembly, said tension member applying a tension force when said tension member is extended between a bicycle saddle support and a bicycle handlebar stem, means for temporary attachment of one end of said tension member end to a bicycle saddle support, and means for temporary attachment of a second end of said tension member to a bicycle handlebar stem.

* * * * *